United States Patent
Bazzocchi (10) Patent No.: US 6,295,161 B1
(45) Date of Patent: Sep. 25, 2001

(54) TWIN COUPLER WITH MODE SCRAMBLING FOR MULTIMODE PUMPING OF OPTICAL AMPLIFIERS

(75) Inventor: Renzo Bazzocchi, Milan (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/244,774

(22) Filed: Feb. 5, 1999

Related U.S. Application Data (63) Continuation of application No. 09/137,685, filed on Aug. 21, 1998, now abandoned.
(60) Provisional application No. 60/057,633, filed on Sep. 5, 1997.

(30) Foreign Application Priority Data

Aug. 23, 1997 (EP) .................................................. 97114622

(51) Int. Cl.[7] .............................. H01S 3/094; H04B 9/00; H04B 10/35
(52) U.S. Cl. .................... 359/341.33; 359/134; 359/160; 359/341.32; 372/71; 385/29
(58) Field of Search .................................. 359/134, 160, 359/341.3, 341.32, 341.33; 372/6, 7; 385/28, 29, 39, 48

(56) References Cited

U.S. PATENT DOCUMENTS

| | | |
|---|---|---|
| 4,676,594 | 6/1987 | Presby . |
| 4,877,305 | 10/1989 | Ricciardelli . |
| 4,974,930 | 12/1990 | Blyler, Jr. et al. . |
| 5,054,878 * | 10/1991 | Gergely et al. ........................ 385/33 |
| 5,263,036 * | 11/1993 | Bernardi .................................... 372/6 |
| 5,430,572 * | 7/1995 | DiGiovanni et al. ................ 359/341 |
| 5,506,723 * | 4/1996 | Junginger ............................. 359/341 |
| 5,701,194 * | 12/1997 | Meli et al. ........................... 359/341 |
| 5,808,786 * | 9/1998 | Shibuya ............................... 359/341 |
| 6,212,216 * | 4/2001 | Pillai ..................................... 372/96 |
| B1 6,181,466 * | 1/2001 | Fravzoso et al. ................... 359/341 |

FOREIGN PATENT DOCUMENTS

| | | |
|---|---|---|
| 0 556 973 | 8/1993 | (EP) . |
| 11-136193 * | 5/1999 | (JP) . |
| WO 96/20519 * | 7/1996 | (WO) . |
| WO 96/29627 * | 9/1996 | (WO) . |

OTHER PUBLICATIONS

Zellmer et al, Cleo '95, vol. 455, pp 7, May 26, 1995.*

Takasaki et al, Journ. of Appl. Physics, vol. 79, #1, pp 4548, 1/1996.*

Shames et al, Optics Letters, vol. 19, #15, pp 1122–24, 8/94.*

* cited by examiner

*Primary Examiner*—Nelson Moskowitz
(74) *Attorney, Agent, or Firm*—Finnegan, Henderson, Farabow, Garrett & Dunner, L.L.P.

(57) ABSTRACT

A twin coupler system couples a multimode pump power signal from a pump fiber to an optical information carrying double-clad signal fiber. The twin coupler system includes first and second optical couplers and a mode scrambler. The first optical coupler couples the pump fiber to the optical signal fiber to transfer outer modes of the pump power signal from the pump fiber into the optical signal fiber. The mode scrambler scrambles the modes of the pump power signal remaining in the pump fiber beyond the first optical coupler. The second optical coupler couples the pump fiber to the optical signal fiber to transfer outer modes of the scrambled pump power signal from the pump fiber into the optical signal fiber.

19 Claims, 7 Drawing Sheets

TWIN COUPLER WITH MODE SCRAMBLING FOR MULTIMODE PUMPING OF OPTICAL AMPLIFIERS

This is a continuation of application Ser. No. 09/137,685, filed Aug. 21, 1998, now abondoned and claims the benefit of U.S. provisional application No. 60/057,633, filed Sep. 5, 1997.

FIELD OF THE INVENTION

The present invention relates generally to a high power multimode optical fiber amplifier pumped by a multimode laser source, and more particularly, to a twin coupler system that increases the output power of a double-clad optical fiber amplifier.

BACKGROUND OF THE INVENTION

Conventional optical fiber amplifiers include active fibers having a core doped with a rare earth element. Pump power at a characteristic wavelength for the rare earth element, when injected into the active fiber, excites the ions of the rare earth element, leading to gain in the core for an information signal propagating along the fiber.

Rare earth elements used for doping typically include Erbium (Er), Neodymium (Nd), Yfterbium (Yb), Samarium (Sm), and Praseodymium (Pr). The particular rare earth element used is determined in accordance with the wavelength of the input signal light and the wavelength of the pump light. For example, Er ions would be used for input signal light having a wavelength of 1.55 $\mu$m and for pump power having a wavelength of 1.48 $\mu$m or 0.98 $\mu$m; codoping with Er and Yb ions, further, allows different and broader pump wavelength bands to be used.

Traditional pump sources include single mode laser diodes and multimode broad area lasers coupled to the active fiber over single mode and multimode pumping fibers, respectively, to provide the pump power. Single mode lasers provide low pump power, typically in the order of 100 mW. Broad area lasers, on the other hand, provide high pump power, in the order of 500 mW. These lasers of high output power, however, cannot efficiently inject light signals into the small core of a single mode fiber. Consequently, the use of high power broad area lasers requires the use of multimode fibers for pumping optical amplifiers.

Broad area lasers generate multimode pump power and input the pump power to a non-active pumping fiber. This non-active pumping fiber in turn typically inputs the pump power through a coupler and into the inner cladding of a double-clad active fiber, acting as a multimode core for the pump pover.

In the amplifier fibers, pump power is guided into the inner multimode cladding of the fiber from which it is transferred into a single mode core doped with an active dopant.

A multimode fused fiber coupler has a theoretical coupling efficiency directly proportional to the ratio of the areas of the two fibers constituting the coupler. In an ideal case for two identical fibers, the coupling efficiency is approximately 50%. Typically, the coupling efficiency is in the range of 45–48%. This means that only about 45–48% of the total pump power output by the pump source into the pumping fiber actually passes from the pumping fiber into the inner cladding of the double-clad active fiber, while the remaining 52–55% remains in the pumping fiber.

Some systems use two optical fibers having different diameter of multimode cores to improve the coupling efficiency of the multimode coupler. However, such arrangements often lead to a waste of power due to the difficulty in matching the tapering of two cores of different size.

Figure 1:
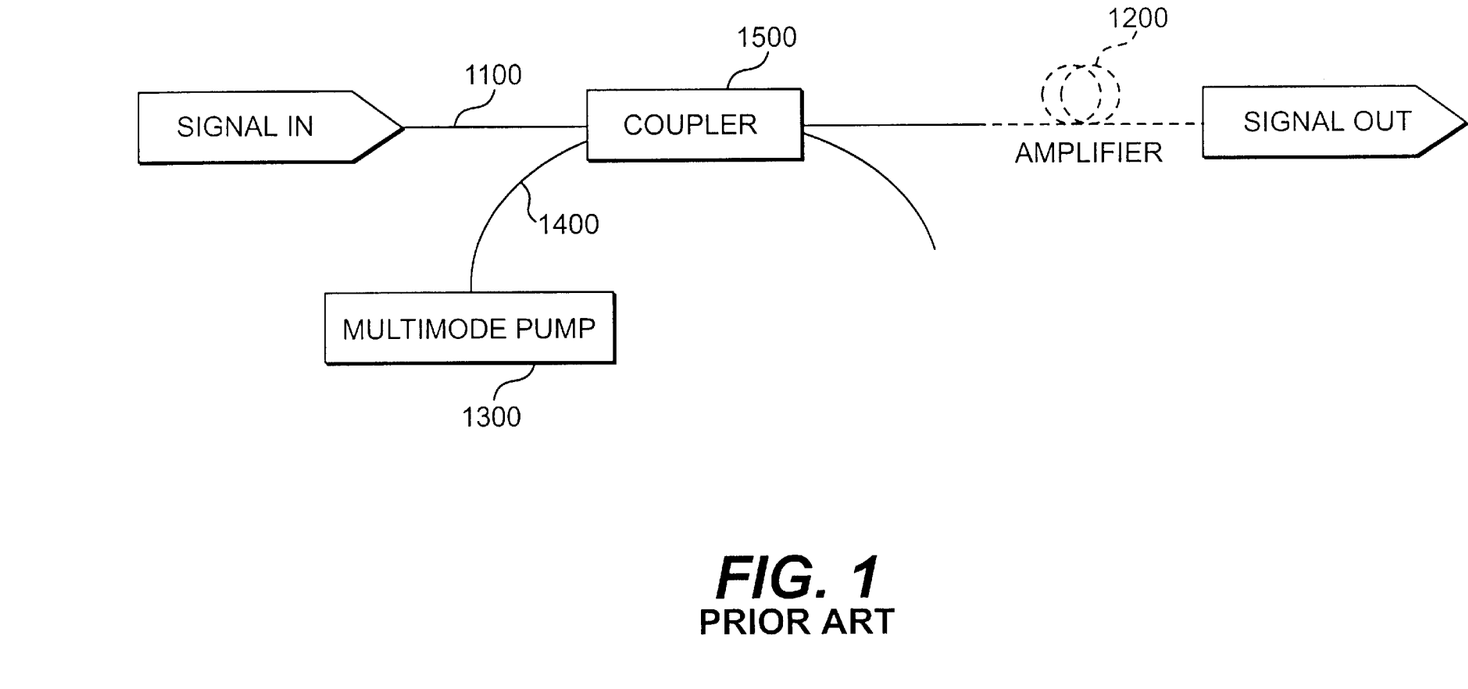
FIG. 1 is a block diagram of a conventional system containing a multimode pump source coupled to a primary fiber via a single traditional coupler.

FIG. 1 is a block diagram of a conventional amplifying system containing a multimode pump source coupled to a primary fiber via a single traditional coupler. Primary fiber 1100 is a double-clad fiber. The information signal flows through its single mode core. Optical amplifier 1200, which may take the form of an Er/Yb doped double-clad active fiber, amplifies the information signal as it propagates through the single mode core of primary fiber 1100.

Multimode pump power generated by multimode pump 1300 is coupled into primary fiber 1100 via multimode pump fiber 1400 and coupler 1500. Coupler 1500 is a conventional fused fiber wavelength division multiplexer (WDM) type coupler. WDM couplers behave as multimode couplers for the pump power and transmit the single mode signal along the primary fiber substantially without coupling to the pump fiber. WDM couplers have maximum coupling efficiencies of 50% for the pump power, and typically have coupling efficiencies in the range of about 45%.

Multimode pump 1300 may take the form of a broad area laser that outputs multimode pump power of approximately 450–500 mW. Due to the coupling efficiency of coupler 1500, however, only about 45% of this pump power, or approximately 200–225 mW, enters primary fiber 1100. The remaining 55% of the pump power is lost, as it exits from pump fiber 1400.

Such a structure passes most of the outer modes of the pump power to primary fiber 1100, leaving the inner modes of the pump power to exit pump fiber 1400. Applicants have observed that the loss of pump power and the inefficient coupling of traditional couplers lead to insufficient coupling of the total pump power output from the multimode pump to the active fiber.

To increase the coupling efficiency, some conventional systems utilize microoptic couplers. Microoptic couplers couple optical beams using a wavelength selective mirror and a focusing lens. With this construction, microoptic couplers obtain much better coupling efficiencies than traditional WDM couplers, typically in the range of 89%. But microoptic couplers have several drawbacks which limit their use: (1) limited period of reliability because coupling of the optical beams takes place in air; (2) difficult to construct due to alignment difficulties; (3) very expensive compared to traditional WDM couplers; (4) unpredictable lifetime of the selective mirror dielectric layer due to the very high optical powers; and (5) high insertion losses.

Several articles in the patent and non-patent literature address multimode coupling techniques but do not discuss ways of overcoming the deficiencies of other conventional approaches described above. WO 96/20519 discloses a coupling arrangement for transferring light power between a multimode light source and a multimode optical fiber through a length of an intermediate feeding multimode optical fiber. The multimode feeding fiber has a progressively tapered portion and is fused to the multimode optical fiber at or near the tapered portion.

U.S. Pat. No. 4,877,305 discloses a mode mixer, or mode scrambler, achieved by inserting a length of fiber optic material inside a length of tubing, forming the tubing into a circular spiral having at least two coils, and then splaying the coils to be non-planar.

U.S. Pat. No. 4,676,594 discloses an optical fiber mode scrambler achieved by forming a deformation such as a groove or notch on one side of a multimode or graded-index optical fiber.

U.S. Pat. No. 4,974,930 discloses a mode scrambling arrangement for a multimode optical fiber that irradiates the cladding of the optical fiber using ultraviolet light to change the index of refraction of the cladding.

In Applicants' view, none of the known literature has recognized Applicants' discovery that conventional systems have failed to couple sufficient pump power, thereby leading to an inadequate overall pump power transfer efficiency.

SUMMARY OF THE INVENTION

Systems and methods consistent with the principles of the present invention address the above problems in a twin coupler system scrambling the modes of the multimode pump power remaining in the pumping fiber beyond a first coupler (i.e., the residual pump power) and recoupling the scrambled residual pump power into the information carrying double-clad fiber using a second coupler.

In accordance with the invention as embodied and broadly described herein, the present invention in one aspect includes a twin coupler system having an optical signal fiber configured to receive and transport an optical signal, a pump fiber configured to receive and transport a multimode pump power signal, first and second couplers, and a mode scrambler. The first coupler couples the pump fiber to the optical signal fiber to transfer a first portion of the pump power signal from the pump fiber into the optical signal fiber. The mode scrambler scrambles the modes of a second portion of the pump power signal as the second portion of the pump power signal travels through the pump fiber beyond the first coupler. The second coupler couples the pump fiber to the optical signal fiber to transfer at least some of the scrambled second portion of the pump power signal from the pump fiber into the optical signal fiber.

In another aspect, the present invention includes a method for transferring a multimode pump power signal into an active information carrying double-clad optical fiber in a twin coupler system. The method includes transferring a first portion of the multimode pump power signal from the pump fiber to the active optical fiber at the first optical coupler, scrambling modes of a second portion of the multimode pump power signal as the second portion of the multimode pump power signal propagates through the pump fiber beyond the first optical coupler, and transferring at least some of the scrambled second portion of the multimode pump power signal from the pump fiber to the active optical fiber at the second optical coupler.

In another aspect, the present invention includes a method for manufacturing a twin coupler system. The manufacturing method includes coupling a first multimode pumping fiber to a primary fiber via a first optical coupler, coupling a second multimode pumping fiber to the primary fiber via a second optical coupler, and constructing a mode scrambler between the first and second optical couplers using the first and second multimode pumping fibers.

The present invention further includes a multiple coupler system having an active optical signal fiber configured to receive and transport a multimode optical signal and a pump fiber configured to receive and transport a multimode pump power signal. The multiple coupler system includes a first optical coupler for coupling the pump fiber to the optical signal fiber to transfer outer modes of the pump power signal from the pump fiber into the optical signal fiber, a mode scrambler configured to scramble modes of the pump power signal remaining in the pump fiber beyond the first optical coupler, and a second coupler for coupling the pump fiber to the optical signal fiber to transfer outer modes of the scrambled pump power signal from the pump fiber into the optical signal fiber.

In a further aspect, the present invention includes a method for transferring a multimode pump power signal into an active information carrying optical fiber in a multiple coupler system having first and second optical couplers for coupling a multimode pump fiber to the active optical fiber. The method includes the steps of transferring outer modes of the multimode pump power signal from the multimode pump fiber to the active optical fiber at the first optical coupler, scrambling modes of the multimode pump power signal remaining in the multimode pump fiber beyond the first optical coupler, and transferring outer modes of the scrambled multimode pump power signal from the pump fiber to the active optical fiber at the second optical coupler.

It is to be understood that both the foregoing general description and the following detailed description are exemplary and are intended to provide further explanation of the invention as claimed.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings. The same reference numbers identify the same or similar elements.

The description includes exemplary embodiments, other embodiments are possible, and changes may be made to the embodiments described without departing from the spirit and scope of the invention. The following detailed description does not limit the invention. Instead, the scope of the invention is defined only by the appended claims.

Systems and methods consistent with the principles of the present invention achieve high transfer efficiency of multimode pumping power to an active information carrying double-clad fiber by mode scrambling and recoupling residual pumping power using a twin coupler system.

Figure 2A:
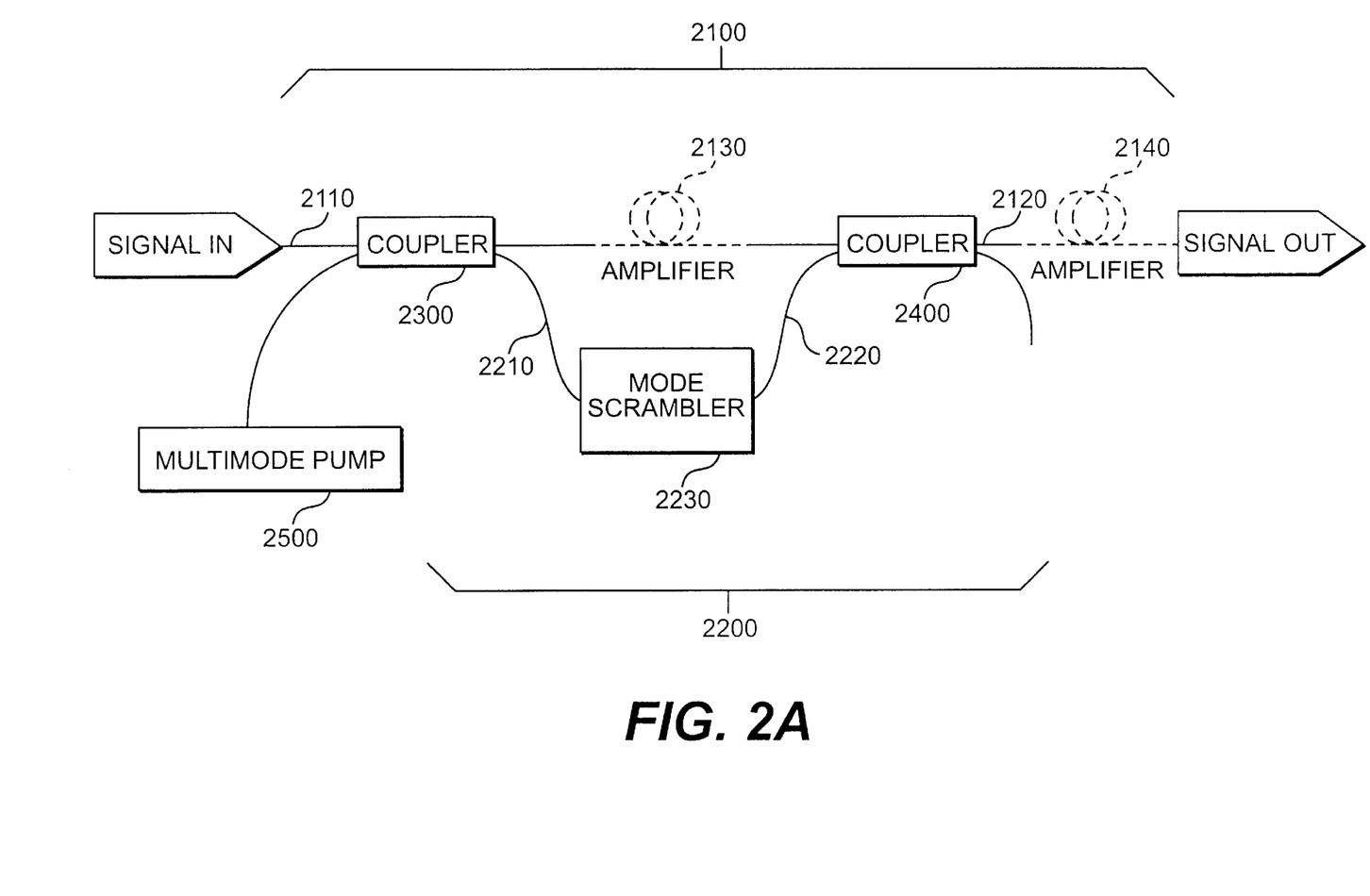
FIG. 2A is a block diagram of a twin coupler system in a copropagating configuration consistent with the principles of the present invention.
Figure 2B:
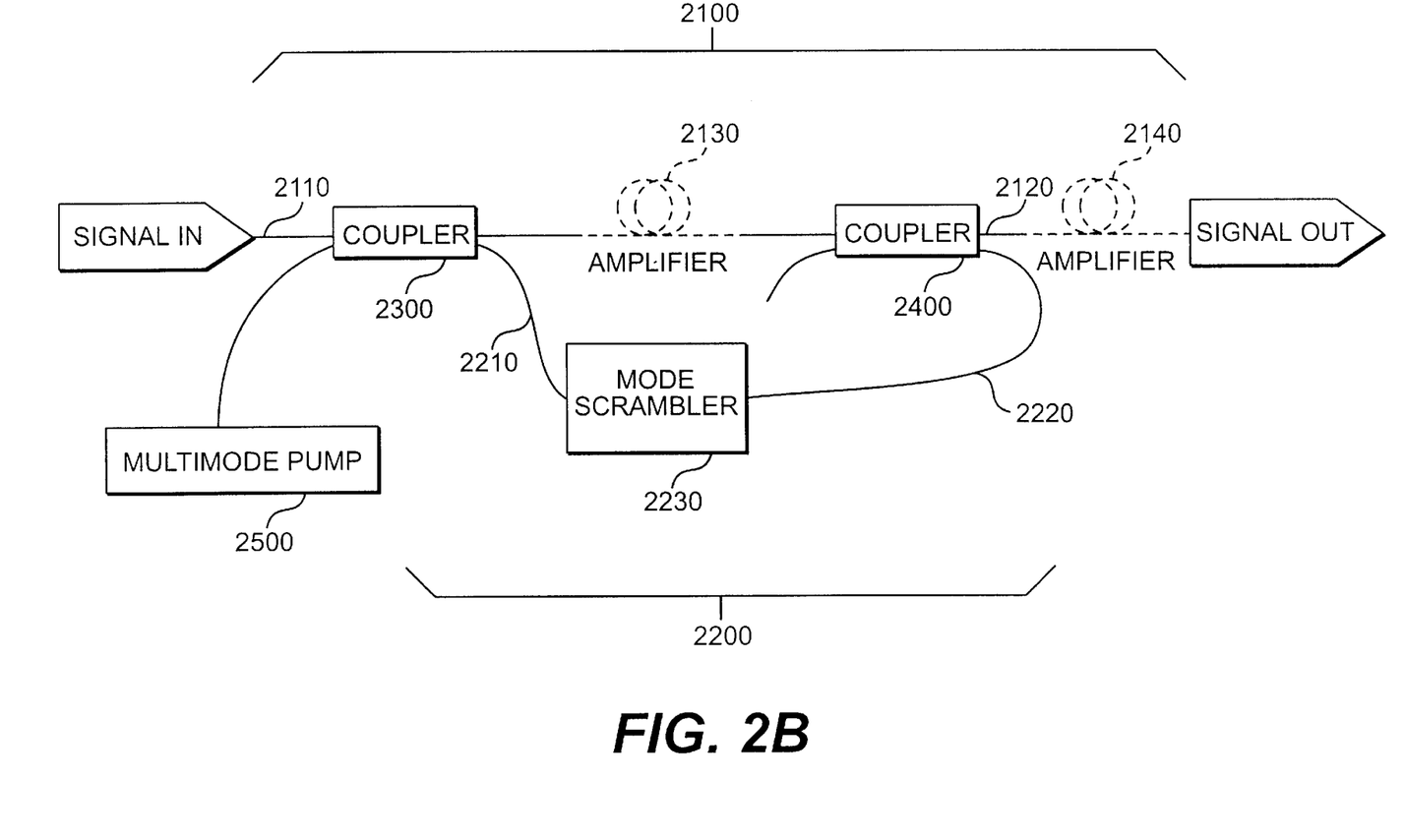
FIG. 2B is a block diagram of a twin coupler system in a counterpropagating configuration consistent with the principles of the present invention.

FIGS. 2A and 2B are block diagrams of amplifier systems having twin coupler systems in copropagating and counterpropagating configurations, respectively, consistent with the principles of the present invention. Each of the amplifier system can be coupled as a high power optical amplifier in an optical fiber communication system; in this case input of fiber 2110 and output of amplifier fiber 2140 are in general spliced to a single mode fiber of the communication system. Each of the amplifier systems may to advantage constitute a power booster amplifier or a line amplifier.

The twin coupler systems include two different types of multimode optical fibers, primary fiber 2100 and pump fiber 2200, coupled together by two identical couplers 2300 and 2400, and a multimode pump 2500 that supplies multimode pump power to pump fiber 2200.

Figure 3A:
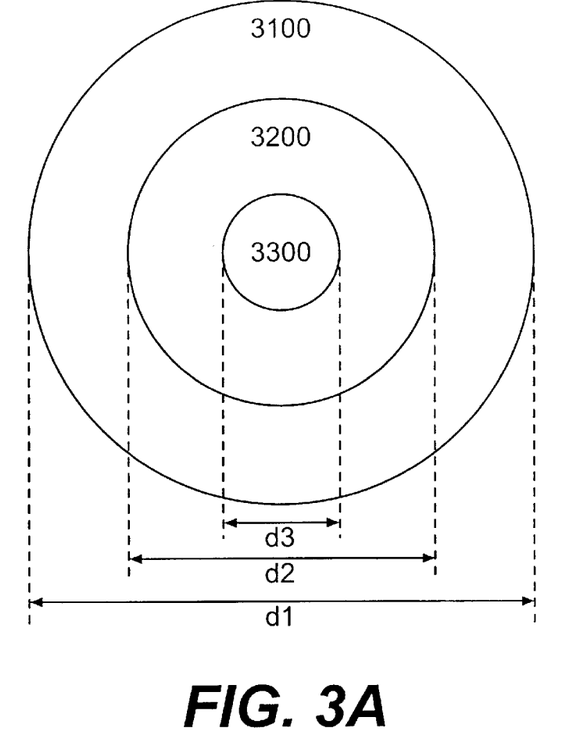
FIG. 3A is a diagram depicting a cross-sectional view of the primary fiber of FIGS. 2A and 2B.

Primary fiber 2100 through which the information signal flows includes signal fiber 2110, signal fiber 2120, and optical amplifiers 2130 and 2140. Signal fibers 2110 and 2120 are matched double-clad fibers, and optical amplifiers 2130 and 2140 are double-clad Er/Yb fibers doped to amplify the information signal as it propagates through primary fiber 2100. FIG. 3A is a diagram depicting a cross-sectional view of signal fibers 2110 and 2120, and FIG. 3B is a graph of the different indexes of refraction of signal fibers 2110 and 2120.

Figure 3B:
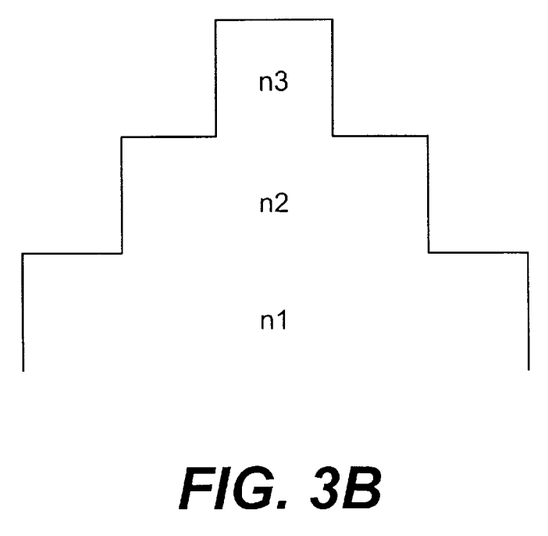
FIG. 3B is a graph of the different indexes of refraction of the primary fiber of FIGS. 2A and 2B.

As shown in FIGS. 3A and 3B, signal fibers 2110 and 2120 include three kinds of glass forming concentric regions 3100, 3200, and 3300 having different indexes of refraction n1, n2, and n3, respectively, and different diameters d1, d2, and d3, respectively. In an implementation consistent with the principles of the present invention, signal fibers 2110 and 2120 are constructed such that the indexes of refraction have the relationship $n1<n2<n3$, and the diameters d1, d2, and d3 of the three concentric regions 3100, 3200, and 3300 achieve single mode optical propagation for the information signal in region 3300 and multimode optical propagation for the pump power in region 3200. In other words, region 3300 surrounded by region 3200 forms a single mode core for the information signal. Region 3200 surrounded by region 3100, on the other hand, forms a multimode core for the pump power.

In an implementation consistent with the principles of the present invention, the diameters of concentric regions 3100, 3200, and 3300 have the values:

$$d1 = 90 \ \mu m \tag{1}$$

$$d2 = 60 \ \mu m \tag{2}$$

$$d3 = 4 \ \mu m \tag{3}$$

Couplers 2300 and 2400 are identical optical fiber couplers for transferring pump power from pump fiber 2200 to signal fibers 2110 and 2120, respectively. In an implementation consistent with the principles of the present invention, couplers 2300 and 2400 are WDM couplers manufactured by a fusion biconical tapering technique, but may, alternatively, comprise other types of optical couplers, including microoptic couplers or combinations of fusion and microoptic couplers. Like the conventional couplers described above, each of couplers 2300 and 2400 has a theoretical coupling efficiency limit of 50%. This twin coupler configuration may be used in both the copropagating and counterpropagating configurations depicted in FIGS. 2A and 2B, respectively.

Figure 4A:
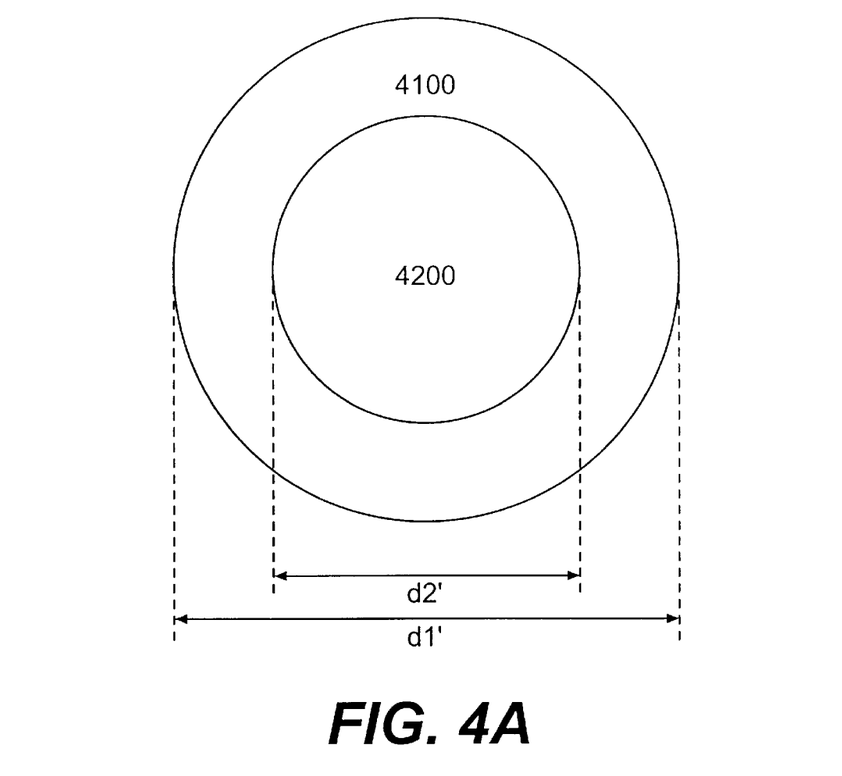
FIG. 4A is a diagram depicting a cross-sectional view of the pump fiber of FIGS. 2A and 2B.

Multimode pump 2500 is coupled to signal fibers 2110 and 2120 via couplers 2300 and 2400, respectively, to supply pump power. In an implementation consistent with the principles of the present invention, multimode pump 2500 is a broad area laser that outputs multimode pump power to pump fiber 2200. Pump fiber 2200 is a multimode optical fiber that carries the multimode pump power, and includes pumping fibers 2210 and 2220 spliced together through mode scrambler 2230. FIG. 4A is a diagram depicting a cross-sectional view of pumping fibers 2210 and 2220, and FIG. 4B is a graph of the different indexes of refraction of pump fibers 2210 and 2220.

Figure 4B:
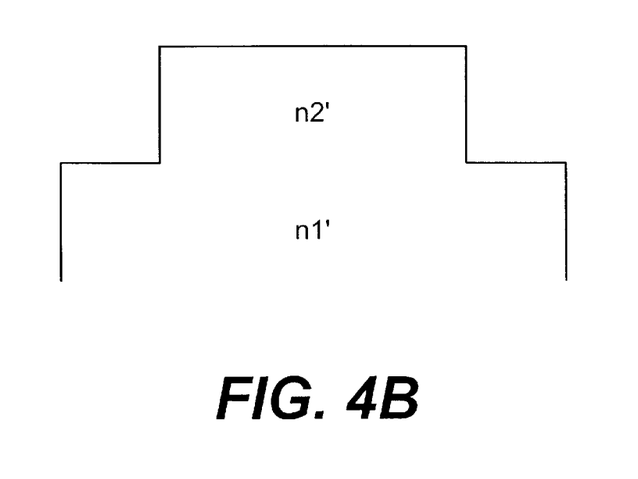
FIG. 4B is a graph of the different indexes of refraction of the pump fiber of FIGS. 2A and 2B.

As shown in FIGS. 4A and 4B, pump fibers 2210 and 2220 include two different types of glass forming concentric regions 4100 and 4200 having different indexes of refraction n1' and n2', respectively, and different diameters d1' and d2', respectively. In an implementation consistent with the principles of the present invention, pumping fibers 2210 and 2220 are constructed such that the indexes of refraction have the relationship $n1'<n2'$. The diameters d1' and d2' of the two concentric regions 4100 and 4200 achieve multimode optical propagation for the pump power in region 4200. In other words, region 4200 surrounded by region 4100 forms a multimode core for the pump power.

In an implementation consistent with the principles of the present invention, the diameters of concentric regions 4100 and 4200 have the following relationships:

$$d1' = 90 \ \mu m \tag{4}$$

$$d2' = 60 \ \mu m \tag{5}$$

Even though the concentric regions of pumping fibers 2210 and 2220 have been described as having the same indexes of refraction and diameters as the concentric regions of signal fibers 2110 and 2120, this need not be the case.

Mode scrambler 2230 scrambles the modes of the residual pump power remaining in pumping fiber 2210 after coupler 2300. As stated above, a maximum of 50% of the pump power signal passes into signal fiber 2110 at coupler 2300. Coupler 2300 provides an efficient pump power transfer for the outer modes of the pump power signal, leaving the inner modes in pumping fiber 2210. Mode scrambler 2230 mode scrambles the inner modes of the residual pump power signal to increase the coupling efficiency of coupler 2400.

Figure 5A:
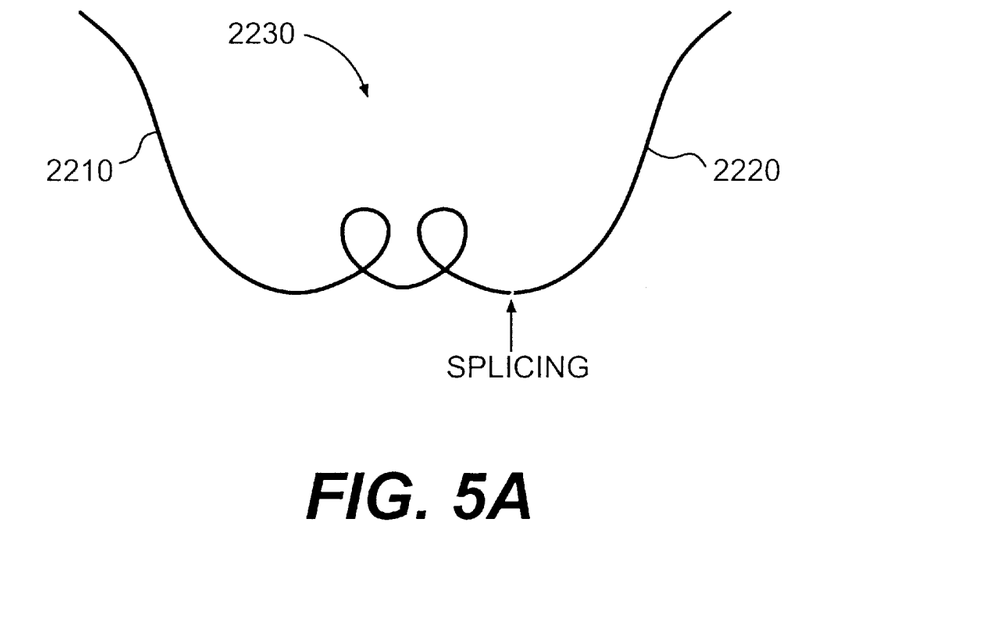
FIGS. 5A–5D are diagrams of the mode scrambler of FIGS. 2A and 2B in different implementations consistent with the principles of the present invention.

FIGS. 5A–5D are diagrams of mode scrambler 2230 in different implementations consistent with the principles of the present invention. FIG. 5A is a diagram of mode scrambler 2230 in which mode scrambler 2230 takes the form of two loops. The loops consistent with the principles of the present invention are concentric in shape and have a diameter of 2 cm.

The loops scramble the modes of the residual pump power remaining in pumping fiber 2210 after coupler 2300. Variations in the number, size, shape, and orientation of the loops permit the characteristics of mode scrambler 2230 to be varied. While FIG. 5A shows the loops being formed in pumping fiber 2210, the loops may be alternatively formed in pumping fiber 2220 or in both pumping fibers 2210 and 2220.

The splice coupling pumping fiber 2210 to pumping fiber 2220 produces mechanical stress that provides additional mode scrambling of the residual pump power. The splice could be a mode scrambler itself as shown in FIG. 5C. The location of the splice in FIG. 5A is exemplary only and the splice may be located prior to, within, or after the loops.

Figure 5B:
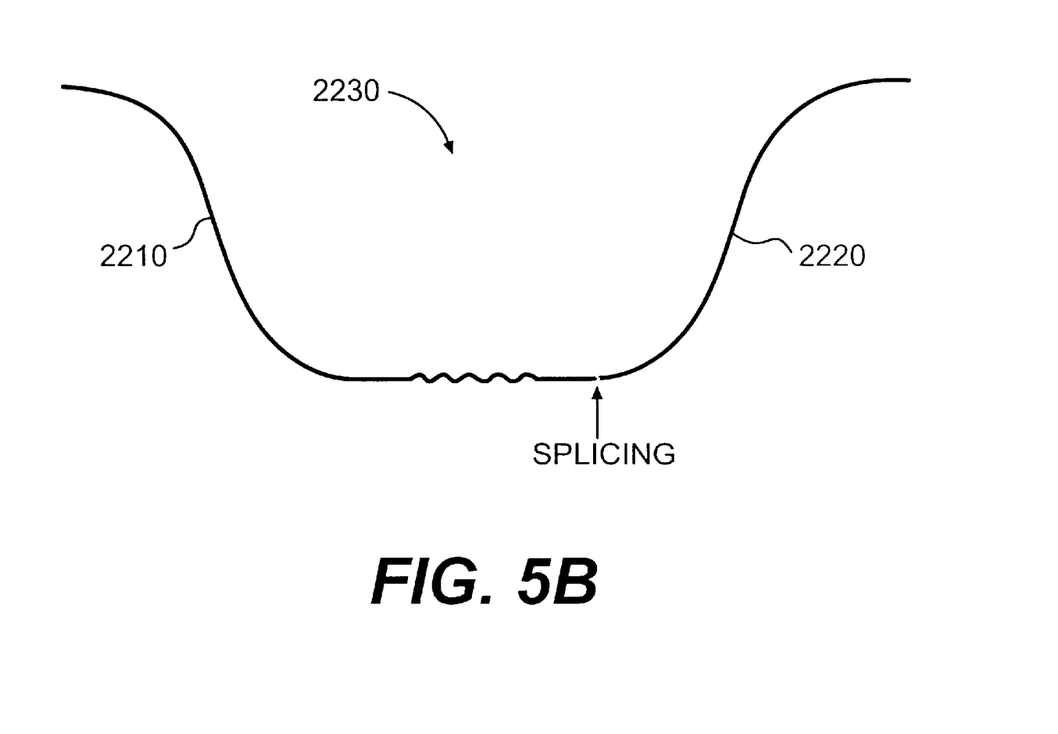
Figure 5C:
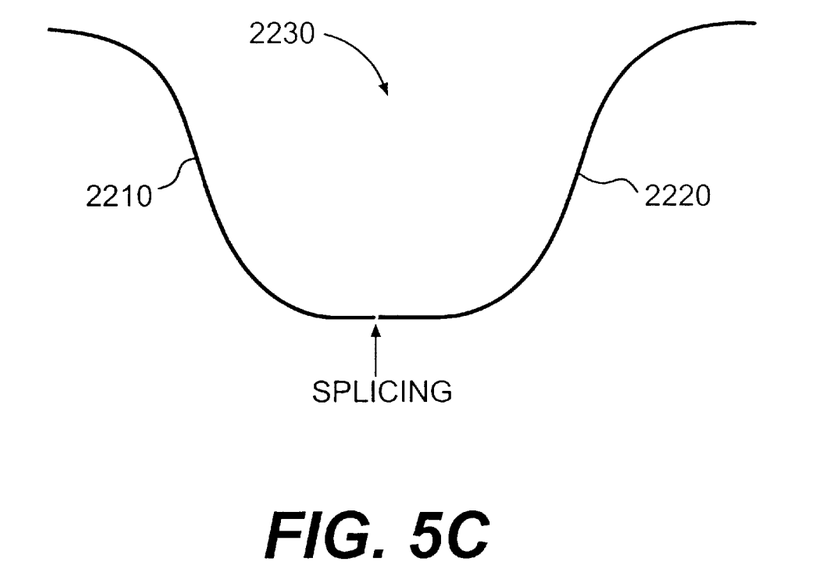

FIG. 5B is a diagram of mode scrambler 2230 in which mode scrambler 2230 takes the form of a 720° longitudinal torsion in the pump fiber. Mode scrambler 2230 is formed by twisting a region of pumping fiber 2210 between couplers 2300 and 2400.

The twisting of pumping fiber 2210 scrambles the modes of the residual pump power remaining in pumping fiber 2210 after coupler 2300. Variations in the degree of twisting and the length of the torsion region permit the characteristics of mode scrambler 2230 to be varied. While FIG. 5B shows the torsion region being formed in pumping fiber 2210, the torsion region may alternatively be formed in pumping fiber 2220 or in both pumping fibers 2210 and 2220. The location of the splice, coupling pumping fiber 2210 to pumping fiber 2220, may be before, after, or within the torsion region.

FIG. 5C is a diagram of mode scrambler 2230 in which the scrambler is embodied in the splice coupling pumping fibers 2210 and 2220 together. The splice produces a mechanical stress in both fibers that scrambles the modes of the residual pump power remaining in pumping fiber 2210 after coupler 2300.

2120 at coupler 2400. Therefore, at coupler 2400, approximately 45% of the scrambled residual pump power signal enters signal fiber 2120, and amplifier 2140 uses the pump power signal to amplify the information signal traveling through primary fiber 2100.

Under ideal circumstances, 50% of the pump power signal enters primary fiber 2100 at each of couplers 2300 and 2400. This would lead to a total coupling efficiency for the twin coupler system of 75%. In practice, however, the total coupling efficiency is closer to 68%, but still much higher than conventional systems.

The following table compares the performance of the twin coupler system consistent with the principles of the present invention with conventional systems.

| Amplifier Configuration | Pump Laser Power | Input Power | Output Power | Gain (dB) | Rin Total | NF (dB) |
| --- | --- | --- | --- | --- | --- | --- |
| Simple fusion WDM | 600 mW @ 1A | +3 dBm | +13 dBm | 10 | −152 dBm (Rin laser = −162 dBm) | 6.4 |
| Simple fusion WDM | 600 mW @ 1A | 0 dBm | +12 dBm | 12 | | 6.8 |
| Simple microoptics coupler | 440 mW @ 650 mA | 0 dBm | +16 dBm | 16 | −147.6 dBm (Rin laser = −162.64 dBm) | 7.69 |
| Simple microoptics coupler | 440 mW @ 650 mA | +3 dBm | +17 dBm | 14 | −150.98 dBm (Rin laser = −162.64 dBm) | 7.16 |
| Twin coupler with 3 isolators | 600 mW @ 1A | +3 dBm | +16.5 dBm | 12.5 | −152 dBm | 6.5 |
| Twin coupler with 2 isolators | 580 mW @ 800 mA | +3 dBm | +15.3 dBm | 12.8 | −151.8 dBm | 6.5 |

Figure 5D:
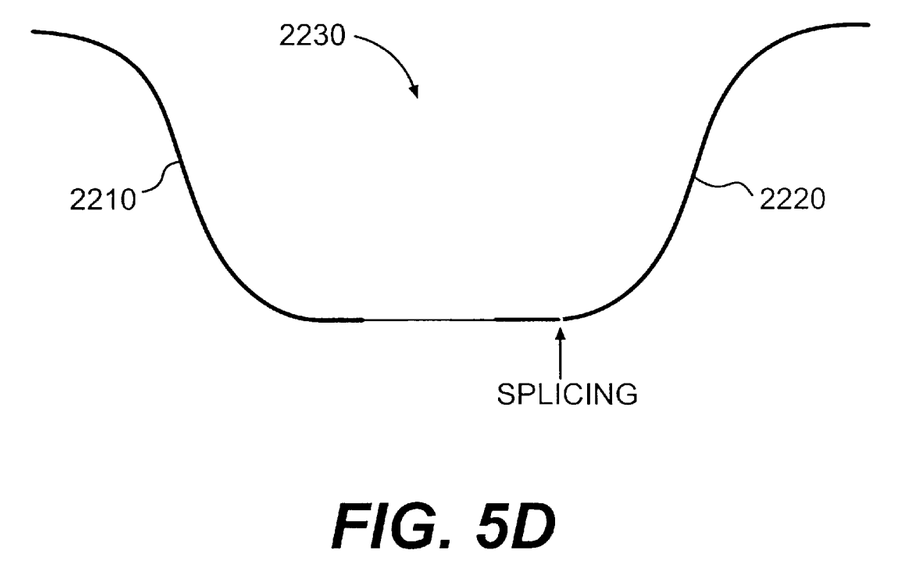

FIG. 5D is a diagram of mode scrambler 2230 in which the scrambler takes the form of a tapered region. Mode scrambler 2230 is formed by tapering a portion of pumping fiber 2210 between couplers 2300 and 2400.

The tapering of pumping fiber 2210 scrambles the modes of the residual pump power remaining in pumping fiber 2210 after coupler 2300. Variations in the amount of tapering and the length of the tapered region permit the characteristics of mode scrambler 2230 to be varied. While FIG. 5D shows the tapering region being formed in pumping fiber 2210, the tapered region may alternatively be formed in pumping fiber 2220 or in both pumping fibers 2210 and 2220. The location of the splice, coupling pumping fiber 2210 to pumping fiber 2220, can be before, after, or within the tapered region.

Operation of the twin coupler system in the copropagating configuration consistent with the principles of the present invention will now be described with reference to FIG. 2A. Multimode pump 2500 generates a multimode pump power signal and outputs the pump power signal through pumping fiber 2210. At coupler 2300, approximately 45% of the pump power signal enters signal fiber 2110, and amplifier 2130 uses the pump power signal to amplify the information signal traveling through primary fiber 2100. As described above, the 45% of the pump power signal entering signal fiber 2110 contains the outer modes of the multimode pump power signal generated by multimode pump 2500.

Mode scrambler 2230 scrambles the inner modes comprising the residual pump power signal; that is, the 55% of the pump power signal that did not enter signal fiber 2110. By scrambling the modes of the residual pump power signal, mode scrambler 2230 generates a multimode pump power signal that can be efficiently transferred into signal fiber The three isolator arrangement specified in the table positions a conventional isolator before the first coupler, between the first and second couplers, and after the second coupler. The two isolator arrangement, on the other hand, removes the isolator from between the first and second couplers. The input and output powers specified in the table refer to the power at the ends of the amplifier.

Results similar to those given in the table above are obtained by the twin coupler system in the counterpropagating configuration depicted in FIG. 2B. Experimental results indicate that there is no degradation in terms of interferometric noise as represented by Noise Figure (NF). In fact, the NF for the twin coupler system is comparable to the NF for a standard single fusion coupler.

The systems and methods consistent with the principles of the present invention transfer multimode pump power to an active double-clad fiber with increased coupling efficiency over conventional systems by mode scrambling and recoupling residual pump power.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, though an amplifying system for single mode optical signals has been disclosed so far, the skilled in the art may use this invention with an amplifying system for multimode signals by adopting, where appropriate, fibers having a multimode signal core instead of a single mode core.

The foregoing description included specific data values and obtained through experimentation. These values serve as examples only and the true scope of the invention is defined only by the claims and their equivalents.

What is claimed is:

1. A twin coupler system comprising:
   an optical signal fiber configured to receive and transport an optical signal;
   a pump fiber configured to receive and transport a multimode pump power signal;
   a first coupler for coupling the pump fiber to the optical signal fiber to transfer a first portion of the pump power signal from the pump fiber into the optical signal fiber;
   a mode scrambler for scrambling modes of a second portion of the pump power signal as the second portion of the pump power signal travels through the pump fiber beyond the first coupler; and
   a second coupler for coupling the pump fiber to the optical signal fiber to transfer at least some of the scrambled second portion of the pump power signal from the pump fiber into the optical signal fiber.

2. The twin coupler system of claim 1, wherein the first portion of the pump power signal includes outer modes of the multimode pump power signal and the second portion of the pump power signal includes modes of the multimode pump power signal remaining in the pump fiber beyond the first coupler;
   wherein the first coupler includes
      means for transferring the outer modes of the pump power signal from the pump fiber into the optical signal fiber;
   wherein the mode scrambler includes
      means for scrambling the remaining modes of the pump power signal; and
   wherein the second coupler includes
      means for transferring outer modes of the scrambled pump power signal from the pump fiber into the optical signal fiber.

3. The twin coupler system of claim 1, wherein the mode scrambler includes
   a length of optical fiber forming at least two loops to scramble the second portion of the pump power signal.

4. The twin coupler system of claim 1, wherein the mode scrambler includes
   a twisted length of optical fiber to scramble the second portion of the pump power signal.

5. The twin coupler system of claim 1, wherein the mode scrambler includes
   a tapered length of optical fiber to scramble the second portion of the pump power signal.

6. The twin coupler system of claim 1, wherein the mode scrambler includes
   a splice in the pump fiber between the first and second couplers to scramble the second portion of the pump power signal.

7. The twin coupler system of claim 1, wherein a total coupling efficiency for the twin coupler system is approximately 68%.

8. A method for transferring a multimode pump power signal into an active information carrying optical fiber in a twin coupler system having first and second optical couplers for coupling a pump fiber, configured to carry the multimode pump power signal, to the active optical fiber, comprising the steps of:
   transferring a first portion of the multimode pump power signal from the pump fiber to the active optical fiber at the first optical coupler;
   scrambling modes of a second portion of the multimode pump power signal as the second portion of the multimode pump power signal propagates through the pump fiber beyond the first optical coupler; and
   transferring at least some of the scrambled second portion of the multimode pump power signal from the pump fiber to the active optical fiber at the second optical coupler.

9. The method of claim 8, wherein the scrambling step includes the substep of
   propagating the second portion of the multimode pump power signal through at least two loops formed in the pump fiber.

10. The method of claim 8, wherein the scrambling step includes the substep of
    propagating the second portion of the multimode pump power signal through a torsion region formed in the pump fiber.

11. The method of claim 8, wherein the scrambling step includes the substep of
    propagating the second portion of the multimode pump power signal through a splice formed in the pump fiber.

12. The method of claim 8, wherein the scrambling step includes the substep of
    propagating the second portion of the multimode pump power signal through a tapered section formed in the pump filter.

13. A method for manufacturing a twin coupler system having first and second optical couplers for coupling a pump fiber, including first and second multimode pumping fibers, to a primary fiber configured to carry optical information signals, comprising the steps of:
    coupling the first multimode pumping fiber to the primary fiber via the first optical coupler;
    coupling the second multimode pumping fiber to the primary fiber via the second optical coupler;
    constructing a mode scrambler between the first and second optical couplers using the first and second multimode pumping fibers.

14. The manufacturing method of claim 13, wherein the mode scrambler constructing step includes the substeps of
    splicing the first multimode pumping fiber to the second multimode pumping fiber between the first and second optical couplers, and
    forming at least two loops in the spliced first and second multimode pumping fibers between the first and second optical couplers.

15. The manufacturing method of claim 13, wherein the mode scrambler constructing step includes the substeps of
    splicing the first multimode pumping fiber to the second multimode pumping fiber between the first and second optical couplers, and
    twisting a portion of the spliced first and second multimode pumping fibers by a predetermined amount between the first and second optical couplers.

16. The manufacturing method of claim 13, wherein the mode scrambler constructing step includes the substep of
    splicing the first multimode pumping fiber to the second multimode pumping fiber between the first and second optical couplers.

17. The manufacturing method of claim 13, wherein the mode scrambler constructing step includes the substeps of
splicing the first multimode pumping fiber to the second multimode pumping fiber between the first and second optical couplers, and
tapering a portion of the spliced first and second multimode pumping fibers between the first and second optical couplers.

18. A multiple coupler system comprising:
an active optical signal fiber configured to receive and transport a multimode optical signal;
a pump fiber configured to receive and transport a multimode pump power signal;
a first optical coupler for coupling the pump fiber to the optical signal fiber to transfer outer modes of the pump power signal from the pump fiber into the optical signal fiber;
a mode scrambler configured to scramble modes of the pump power signal remaining in the pump fiber beyond the first optical coupler; and
a second coupler for coupling the pump fiber to the optical signal fiber to transfer outer modes of the scrambled pump power signal from the pump fiber into the optical signal fiber.

19. A method for transferring a multimode pump power signal into an active information carrying optical fiber in a multiple coupler system having first and second optical couplers for coupling a multimode pump fiber, configured to carry the multimode pump power signal, to the active optical fiber, comprising the steps of:
transferring outer modes of the multimode pump power signal from the multimode pump fiber to the active optical fiber at the first optical coupler;
scrambling modes of the multimode pump power signal remaining in the multimode pump fiber beyond the first optical coupler; and
transferring outer modes of the scrambled multimode pump power signal from the pump fiber to the active optical fiber at the second optical coupler.

* * * * *